United States Patent
Yosui et al.

(10) Patent No.: US 9,160,060 B2
(45) Date of Patent: Oct. 13, 2015

(54) ANTENNA DEVICE AND COMMUNICATION TERMINAL APPARATUS

(75) Inventors: Kuniaki Yosui, Kyoto-fu (JP); Hiromitsu Ito, Kyoto-fu (JP); Hiroyuki Kubo, Kyoto-fu (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 221 days.

(21) Appl. No.: 13/340,022

(22) Filed: Dec. 29, 2011

(65) Prior Publication Data

US 2012/0098724 A1    Apr. 26, 2012

Related U.S. Application Data

(63) Continuation of application No. PCT/JP2010/063747, filed on Aug. 13, 2010.

(30) Foreign Application Priority Data

Sep. 25, 2009    (JP) ................................. 2009-221626

(51) Int. Cl.
*H01Q 1/24* (2006.01)
*G06K 7/10* (2006.01)
(Continued)

(52) U.S. Cl.
CPC ............ *H01Q 1/243* (2013.01); *G06K 7/10336* (2013.01); *H01Q 1/2216* (2013.01); *H01Q 1/48* (2013.01); *H01Q 7/06* (2013.01)

(58) Field of Classification Search
CPC ... G06K 7/10336; H01Q 7/06; H01Q 1/2216; H01Q 1/243
USPC .................... 343/702, 787, 788, 866
See application file for complete search history.

(56) References Cited

U.S. PATENT DOCUMENTS 6,980,158 B2 * 12/2005 Iguchi et al. ................... 343/702
7,148,851 B2 * 12/2006 Takaki et al. .................. 343/702
(Continued)

FOREIGN PATENT DOCUMENTS

CN    1111829 A    11/1995
CN    1463229 A    12/2003
(Continued)

OTHER PUBLICATIONS

A First Office Action issued by the State Intellectual Property Office of People's Republic of China dated Jul. 10, 2013, which corresponds to Chinese Patent application No. 201080018985.0 and is related to U.S. Appl. No. 13/340,022; with translation.
(Continued)

*Primary Examiner* — Dameon E Levi
*Assistant Examiner* — Hasan Islam
(74) *Attorney, Agent, or Firm* — Studebaker & Brackett PC

(57) ABSTRACT

The disclosure provides an antenna device and communications terminal including such an antenna device. The antenna device includes a coil including a conductor wound around a plate-shaped magnetic core. A flat conductor is positioned adjacent to the coil, and the coil is positioned such that it is closer than the flat conductor to an antenna of a communication partner positioned near the antenna device. The coil conductor includes a first conductor portion adjacent to a first main surface of the magnetic core and a second conductor portion adjacent to a second main surface thereof. A circuit substrate includes a ground electrode formation area and a ground electrode non-formation area. The antenna coil is mounted on the ground electrode non-formation area of the circuit substrate with the first main surface of the magnetic core facing the circuit substrate.

12 Claims, 6 Drawing Sheets

(51) Int. Cl.
*H01Q 1/48* (2006.01)
*H01Q 7/06* (2006.01)
*H01Q 1/22* (2006.01)

(56) References Cited

U.S. PATENT DOCUMENTS

| | | | | |
|---|---|---|---|---|
| 7,764,236 | B2* | 7/2010 | Hill et al. | 343/702 |
| 7,825,860 | B2* | 11/2010 | Ying | 343/700 MS |
| 8,154,464 | B2* | 4/2012 | Gonda et al. | 343/787 |
| 2003/0179151 | A1 | 9/2003 | Senba et al. | |
| 2004/0256468 | A1 | 12/2004 | Akiho et al. | |
| 2005/0001031 | A1 | 1/2005 | Akiho et al. | |
| 2005/0040997 | A1 | 2/2005 | Akiho et al. | |
| 2007/0063902 | A1* | 3/2007 | Leisten | 343/702 |
| 2007/0205291 | A1 | 9/2007 | Aramaki et al. | |
| 2009/0066466 | A1* | 3/2009 | Arimura | 336/221 |
| 2009/0167624 | A1 | 7/2009 | Aramaki et al. | |
| 2009/0189729 | A1 | 7/2009 | Kubo et al. | |
| 2010/0214187 | A1 | 8/2010 | Sugita et al. | |
| 2010/0309081 | A1 | 12/2010 | Kobayashi et al. | |

FOREIGN PATENT DOCUMENTS

| | | |
|---|---|---|
| CN | 100383816 C | 4/2008 |
| CN | 101859923 A | 10/2010 |
| JP | 2000-048152 A | 2/2000 |
| JP | 2001-028510 A | 1/2001 |
| JP | 2002-373319 A | 12/2002 |
| JP | 2004-118440 A | 4/2004 |
| JP | 2004-164547 A | 6/2004 |
| JP | 2004-166176 A | 6/2004 |
| JP | 2004-235884 A | 8/2004 |
| JP | 2006-352370 A | 12/2006 |
| JP | 2007-013662 A | 1/2007 |
| JP | 3975918 | 9/2007 |
| WO | 2008/053631 A1 | 5/2008 |
| WO | 2009/078214 A1 | 6/2009 |

OTHER PUBLICATIONS

Japanese Office Action; Notification of Reason for Rejection; Japanese Patent Application No. 2011-506265; Jun. 22, 2011.
Japanese Office Action; Notification of Reason for Rejection; Japanese Patent Application No. 2011-506281; Jun. 22, 2011.
International Search Report; PCT/JP2010/063747; Nov. 16, 2010.
Written Opinion of the International Searching Authority; PCT/JP2010/063747; Nov. 16, 2010.
M.Satou; Japanese Office Action; JP2011-506265; Jun. 22, 2011.
M.Satou; Japanese Office Action; JP2011-506281; Jun. 22, 2011.
K.Yosui; U.S. Appl. No. 13/339,998; filed Dec. 29, 2011.
The second Office Action issued by the State Intellectual Property Office of People's Republic of China on Jan. 30, 2014, which corresponds to Chinese Patent Application No. 201080018985.0 and is related to U.S. Appl. No. 13/340,022; with translation.
The third Office Action issued by the State Intellectual Property Office of People's Republic of China on Jul. 16, 2014, which corresponds to Chinese Patent Application No. 201080018985.0 and is related to U.S. Appl. No. 13/340,022; with English language translation.
The fourth Office Action issued by the State Intellectual Property Office of People's Republic of China on Jan. 23, 2015, which corresponds to Chinese Patent Application No. 201080018985.0 and is related to U.S. Appl. No. 13/340,022; with English language translation.

* cited by examiner

ANTENNA DEVICE AND COMMUNICATION TERMINAL APPARATUS

CROSS REFERENCE TO RELATED APPLICATIONS

The present application is a continuation of International Application No. PCT/JP2010/063747 filed Aug. 13, 2010, which claims priority to Japanese Patent Application No. 2009-221626 filed Sep. 25, 2009, the entire contents of each of these applications being incorporated herein by reference in their entirety.

TECHNICAL FIELD

The present invention relates to an antenna device for use in, e.g., RFID (radio frequency identification) systems, which communicate with external devices using electromagnetic signals, and a communication terminal apparatus including the same.

BACKGROUND

Japanese Patent No. 3975918 (Patent Literature 1) discloses an antenna device included in a mobile electronic apparatus for use in RFID systems.

As shown in FIG. 1A, an antenna device 70 of Patent Literature 1 includes an asymmetrical coil where two positions are opposed to each other with the center of the winding area of a coil 71 therebetween and the winding pitch varies between the two positions. On a side 71a having a larger winding pitch, a magnetic body 72a is disposed on the back of a main surface opposed to an IC card; on a side 71b having a smaller winding pitch, a magnetic body 71b is disposed on the main surface opposed to the IC card. As shown in FIG. 1B, the distribution of a magnetic field generated by the antenna device 70 is an asymmetrical distribution where the magnetic field is enhanced on the side 71a having a larger winding pitch and a larger line width of the loop coil 71. As shown in FIG. 1C, the antenna device 70 is disposed in a main body 91 of a communication terminal apparatus 90.

SUMMARY

The present disclosure provides an antenna device that can reduce the degradation of communication performance depending on the angle which the antenna device forms with the reading surface of a reader/writer or the like and that can communicate with a reader/writer or the like in a wide angle range, and a communication terminal apparatus including the same.

In one aspect of the disclosure, an antenna device includes an antenna coil and a flat conductor adjacent to the antenna coil. The antenna coil includes a plate-shaped magnetic core having first and second main surfaces and a coil conductor wound around the magnetic core. A gap is provided between the antenna coil and the flat conductor. First and second conductor portions of the coil conductor are disposed in positions that do not overlap each other in a perspective plan view of the magnetic core. The first conductor portion is adjacent to the first main surface of the magnetic core, and the second conductor portion is adjacent to the second main surface thereof. The first main surface of the magnetic core faces a surface (e.g., an extension surface) of the flat conductor. The antenna coil is provided such that the first conductor portion is located adjacent to an end portion of the flat conductor in a plan view of the flat conductor and the antenna coil.

In a more specific embodiment, the gap is a gap through which a magnetic flux generated in the antenna coil can pass when the angle formed by a main surface of the antenna coil and a main surface of an antenna of a communication partner is 45°.

In another more specific embodiment, the flat conductor is a ground electrode formed within a circuit substrate. The antenna coil may be provided on a ground electrode non-formation area of the circuit substrate, the ground electrode non-formation area being an area where the ground electrode is not formed.

In yet another more specific embodiment, the flat conductor may be a ground electrode formed within a circuit substrate. The antenna coil may be provided such that the antenna coil faces the flat conductor.

In still another more specific embodiment, the magnetic core may be a sheet-shaped mixture of a magnetic powder and a resin material or a plurality of sintered magnetic pieces.

In another more specific embodiment, the magnetic core may be formed such that one end portion thereof is thicker than the other portions thereof.

In another aspect of the disclosure, a communication terminal apparatus includes a case and any one of the above-mentioned antenna devices contained in the case.

BRIEF DESCRIPTION OF DRAWINGS

FIG. 2A is a plan view of an antenna device; FIG. 2B is a side view thereof; and FIG. 2C a plan view of an antenna coil 21.

FIG. 9A is a plan view of an antenna device; FIG. 9B is a front view thereof; and FIG. 9C is a schematic sectional view of a communication terminal apparatus.

DETAILED DESCRIPTION

The inventors realized that when an electronic apparatus including the antenna device as described in Patent Literature 1 is held over a reader/writer, communication may be impossible depending on the angle formed by the antenna device of the electronic apparatus and that of the reader/writer. That is, when the communication terminal apparatus communicates with an IC card in parallel therewith, no significant problem occurs; but when the communication terminal apparatus communicates with a fixed reader/writer or the like, and the position (angle) of the communication terminal device relative to the reader/writer varies, communication performance disadvantageously degrades.

Figure 1A:
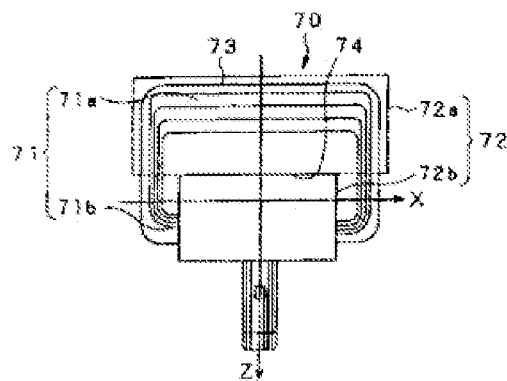
FIGS. 1A to 1D are drawings showing an antenna device described in Patent Literature 1.
Figure 1B:
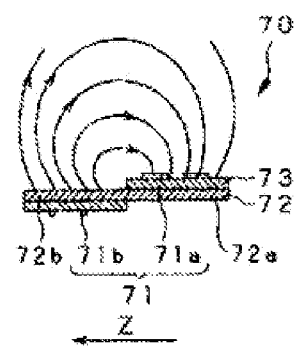
Figure 1C:
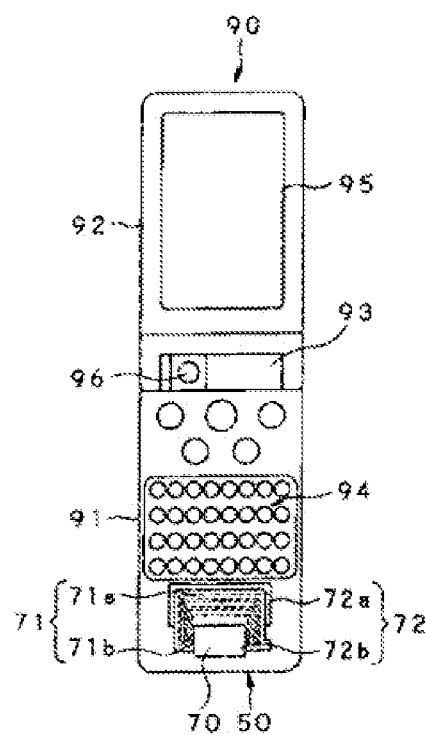
Figure 1D:
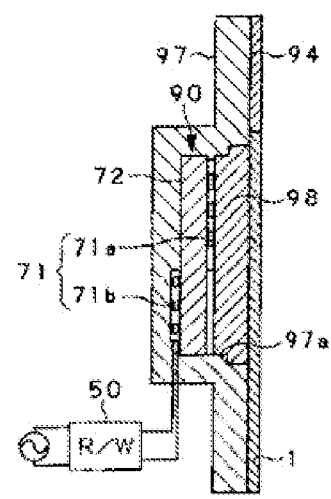

In other words, because the antenna device 70 shown in FIG. 1B is disposed in an antenna housing recess 97a made on a metal case 97, as shown in FIG. 1D, a good communication state is secured in a direction perpendicular to the main surface of the antenna device 70 (i.e., a direction where the angle which the antenna device 70 forms with the antenna of the reader/writer is 0°). However, when the angle formed by the antennas of the reader/writer and the terminal is increased and the distance between the antennas is increased, sufficient communication characteristics are difficult to secure.

Figure 2A:
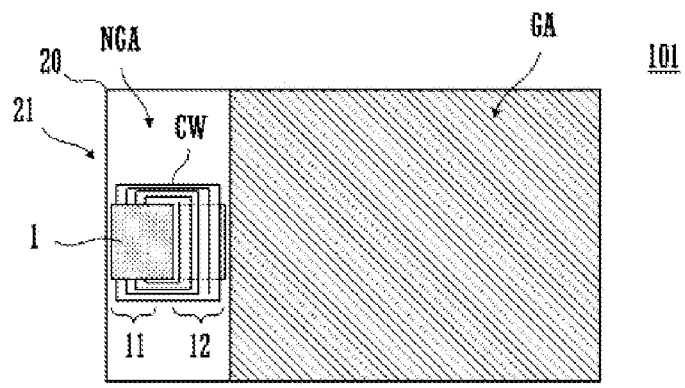
FIGS. 2A to 2C are drawings showing the configuration of an antenna device according to a first exemplary embodiment.
Figure 2B:
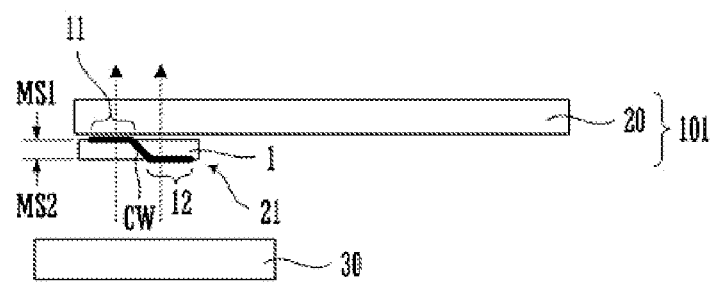
Figure 2C:
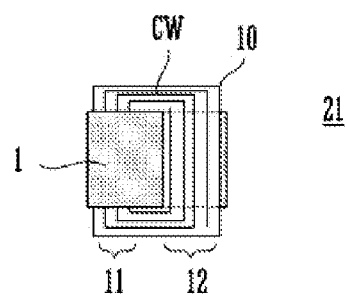

FIGS. 2A to 2C are drawings showing the configuration of an antenna device according to a first embodiment. This antenna device is an antenna device that transmits and receives HF-band signals, e.g., 13.56-MHz signals.

FIG. 2A is a plan view of an antenna device 101 including an antenna coil 21 and a rectangular plate-shaped circuit substrate 20 having the antenna coil 21 mounted thereon. FIG. 2B is a front view of the antenna device 101. FIG. 2C is a plan view of the antenna coil 21.

A magnetic core 1 is a rectangular plate-shaped ferrite core. As shown in FIG. 2, a coil conductor CW is wound around the magnetic core 1. Specifically, the coil conductor CW having a shape of a rectangular spiral is formed on a flexible substrate 10, and a rectangular aperture is made in the central portion of the spiral. The magnetic core 1 is disposed in the aperture.

The coil conductor CW includes a first conductor portion 11 adjacent to a first main surface MS1 of the magnetic core 1 and a second conductor portion 12 adjacent to a second main surface MS2 thereof. The magnetic core 1 and the coil conductor CW form the antenna coil 21.

The circuit substrate 20 includes a ground electrode formation area GA and a ground electrode non-formation area NGA. A ground electrode within the ground electrode formation area GA is a flat conductor according to the present disclosure.

The antenna coil 21 is mounted on the ground electrode non-formation area NGA of the circuit substrate 20 with the first main surface MS1 of the magnetic core 1 facing the circuit substrate 20. Accordingly, the first main surface MS1 of the magnetic core 1 faces a surface of the ground electrode non-formation area NGA (an extension of a surface of the ground electrode formation area GA). The antenna coil 21 is positioned outside an end portion of the ground electrode formation area GA in a plan view of the antenna coil 21 and the ground electrode formation area GA.

The first and second conductor portions 11 and 12 of the coil conductor are disposed such that the conductor portions do not overlap each other in a plan view of the magnetic core 1 (i.e., in a view from the direction of a normal to the first main surface MS1 or second main surface MS2 of the magnetic core 1).

In the state shown in FIG. 2B, the antenna device 101 is positioned (e.g., held over) in parallel with an antenna device 30 of a reader/writer. In this state, magnetic fluxes from the reader/writer interlink with the coil conductor CW of the antenna coil 21, causing magnetic coupling between both antenna devices.

Both end portions of the coil conductor CW of the antenna coil 21 are connected to predetermined terminal electrodes on the circuit substrate 20. The illustration of this connection structure is not shown.

Figure 3:
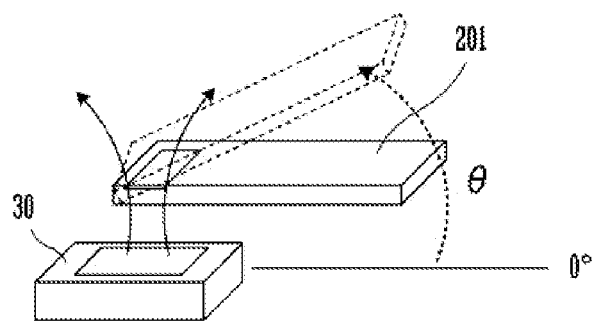
FIG. 3 is a perspective view showing an angle θ, at which a communication terminal apparatus whose case contains the antenna device is held over an antenna device of a reader/writer.

FIG. 3 is a perspective view showing an angle θ, at which a communication terminal apparatus 201 whose case contains the antenna device being positioned (e.g., held) over the antenna device 30 of the reader/writer. The circuit substrate 20 shown in FIGS. 2A and 2B is provided along the case of the communication terminal apparatus. Thus, the disposition of the communication terminal apparatus 201 in parallel with the antenna device 30 of the reader/writer results in the disposition of the antenna device 101 in parallel with the antenna device 30 of the reader/writer. The angle θ in this case is 0°.

Figure 4:
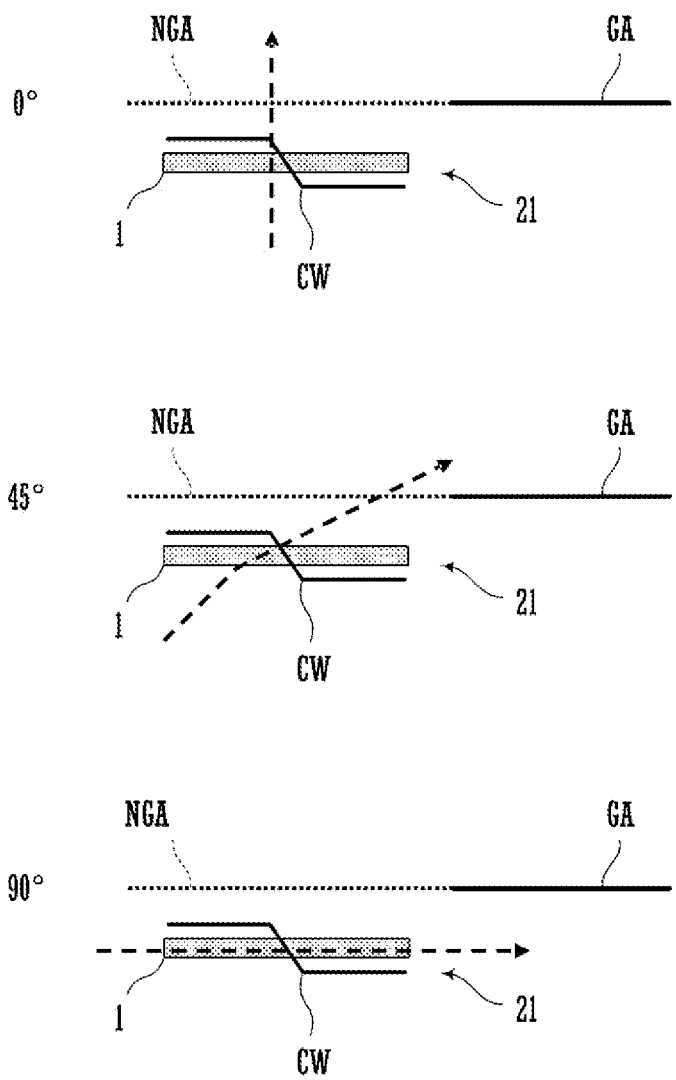
FIG. 4 includes drawings schematically showing the aspect of a magnetic flux passing through the antenna coil when the angle θ shown in FIG. 3 is changed.

FIG. 4 includes drawings schematically showing the aspect of a magnetic flux passing through the antenna coil when the angle θ shown in FIG. 3 is changed.

When θ=0°, the magnetic flux from the reader/writer passes through the central portion of a coil conductor CW formation area in a direction approximately perpendicular to the magnetic core 1.

When θ=45°, the magnetic flux from the reader/writer passes through the central portion of the coil conductor CW formation area in a direction of approximately 45° with respect to the magnetic core 1. Here, a magnetic flux passing through the coil conductor CW in an opposite direction is extremely small.

When θ=90°, the magnetic flux from the reader/writer passes through the central portion of the coil conductor CW formation area in the surface direction of the magnetic core 1. Here again, the direction of the magnetic flux passing through the coil conductor CW is the same.

Accordingly, the magnetic fluxes passing through the magnetic core in both directions do not cancel out each other, regardless of the value of the angle θ, at which the communication terminal apparatus 201 is held over the antenna device 30 of the reader/writer.

Figure 5:
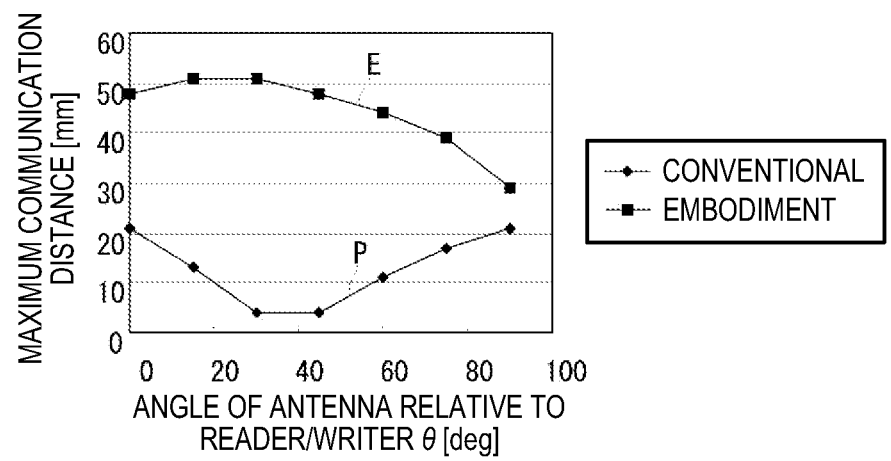
FIG. 5 is a graph showing the relationship between the angle θ, at which the communication terminal apparatus is held over the reader/writer, and the maximum communication distance.

FIG. 5 is a graph showing the relationship between the angle θ, at which the communication terminal apparatus is held over the reader/writer, and the maximum communication distance. In FIG. 5, a line E is a characteristic of the antenna device according to the first embodiment, and a line P is a characteristic of an antenna device having the conventional structure shown in FIG. 1. It is understood that, for the antenna device having the conventional structure, the maximum communication distance is extremely short in the range of 30° to about 45° of the angle θ; for the antenna device according to the present disclosure, the maximum communication distance can remain long over the full range of 0° to 90° (90° or more) of the angle θ.

Figures 6A, 6B:
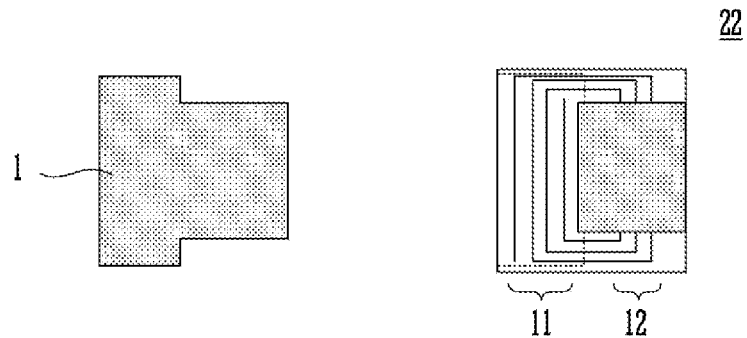
FIG. 6A is a plan view of a magnetic core included in an antenna coil according to a second exemplary embodiment.
FIG. 6B is a plan view of an antenna coil according to the second exemplary embodiment.

FIG. 6A is a plan view of a magnetic core 1 included in an antenna coil according to a second exemplary embodiment, and FIG. 6B is a plan view of an antenna coil 22 according to the second exemplary embodiment.

The difference between the antenna coil 22 and the antenna coil 21 shown in FIG. 2C is that the magnetic core 1 is formed so that one end portion thereof is thicker than the other portions.

Use of the magnetic core 1 having such a shape provides improvements in communication performance, such as strengthening of the magnetic flux passing through the magnetic core 1, strengthening of magnetic coupling with the antenna of a communication partner, and increasing of the maximum communication-capable distance. While, in FIG. 6B, the antenna coil 22 is formed so that the thicker portion of the magnetic core 1 is adjacent to a first conductor portion 11, the antenna coil may be formed so that the thicker portion of the magnetic core 1 is adjacent to a second conductor portion 12. The portion to be thickened (the portion to be widened) of the magnetic core 1 is not limited to the portion adjacent to the first conductor portion 11 or the portion adjacent to the second conductor portion 12. As seen, making one end portion of the magnetic core 1 thicker than the other portions increases the magnetism collection effect. Thus, even when the antenna of the reader/writer is disposed in a slanting direction, high communication performance can be obtained. Further, thickening an end portion of the magnetic core adjacent to an end portion of the ground conductor reduces magnetic resistance in the vicinity of the ground conductor, increasing the magnetism collection effect.

While, in the antenna coil 22 shown in FIG. 6, the magnetic core 1 is formed so that an entire one end portion thereof is wider (i.e., thicker), this portion may have a shape of a trapezoid which is widened outwardly. Alternatively, the magnetic core 1 may have a shape resembling a butterfly so that the width is increased from the center thereof toward both end portions thereof.

Figures 7A, 7B:
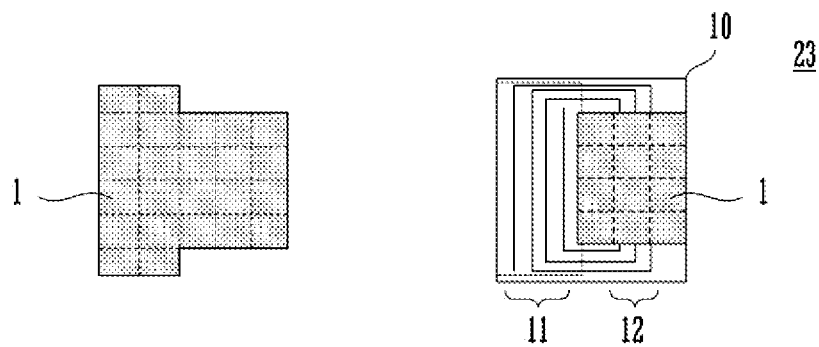
FIG. 7A is a plan view of a magnetic core included in an antenna coil according to a third exemplary embodiment.
FIG. 7B is a plan view of an antenna coil according to the third exemplary embodiment.

FIG. 7A is a plan view of a magnetic core 18 included in an antenna coil according to a third exemplary embodiment, and FIG. 7B is a plan view of an antenna coil 23 according to the third exemplary embodiment. The antenna coil 23 includes a flexible substrate 10, on which the rectangular plate-shaped magnetic core 1 and a coil conductor are formed. The difference between the antenna coil 23 and the antenna coil 22 shown in FIG. 6B is the structure of the magnetic core 1.

The magnetic core 1 shown in FIG. 7A can be provided by forming a mixture of a magnetic powder, such as a ferrite powder, and a resin material into a sheet, forming the sheet into multiple small pieces, sintering the pieces to form sintered magnetic pieces, and laminating both surfaces of the pieces with films. Portions separated by broken lines in FIG. 7 represent the sintered magnetic pieces. Such a structure provides flexibility to the entire magnetic core 1.

While, as shown in FIG. 7B, the antenna coil 23 is formed so that the thicker portion of the magnetic core 1 is adjacent to the first conductor portion 11, the portion to be thickened (the portion to be widened) of the magnetic core 1 is not limited to the portion adjacent to the first conductor portion 11 or the portion adjacent to the second conductor portion 12, as described in the second exemplary embodiment. As seen, making one end portion of the magnetic core 1 thicker than the other portions increases the magnetism collection effect in the position distant from the ground electrode formation area GA of the circuit substrate, further improving communication performance.

Figure 8:
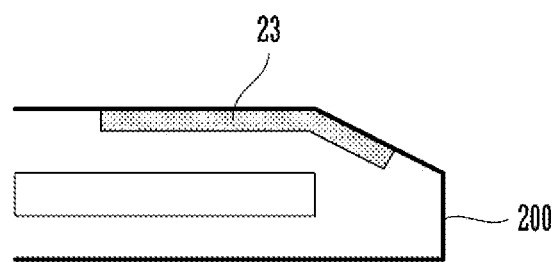
FIG. 8 is a drawing showing the state of the disposition of the antenna coil in a communication terminal apparatus.

FIG. 8 is a drawing showing the state of the disposition of the antenna coil in a communication terminal apparatus. In this example, the antenna coil 23 is attached to the inner surface of a case 200 of the communication terminal apparatus. Due to its flexibility, the antenna coil 23 can be disposed not only on the single plane within the case but also provided along the inner surface thereof. Thus, the antenna coil 23 can be easily built in cases of various shapes. Further, attaching the antenna coil 23 to the inner surface of the case 200 increases the distance from the ground electrode of the circuit substrate to the antenna coil 23, increasing the area through which the magnetic flux passes. Thus, a good communication state can be secured.

Figure 9A:
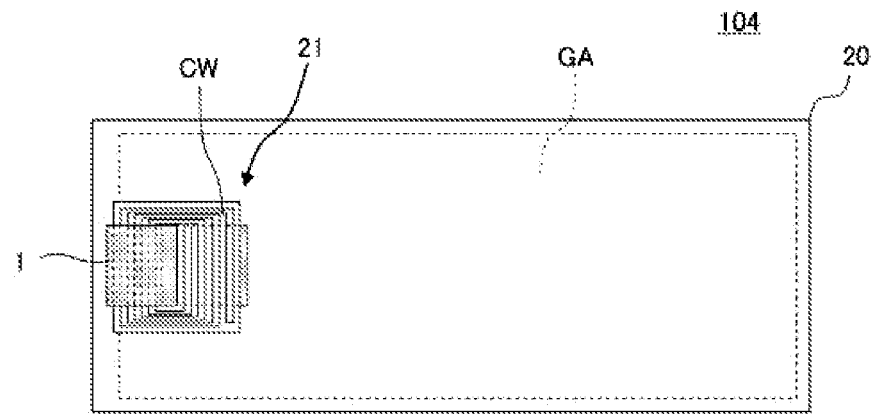
FIGS. 9A to 9C are drawings showing the configuration of an antenna device according to a fourth exemplary embodiment.
Figure 9B:
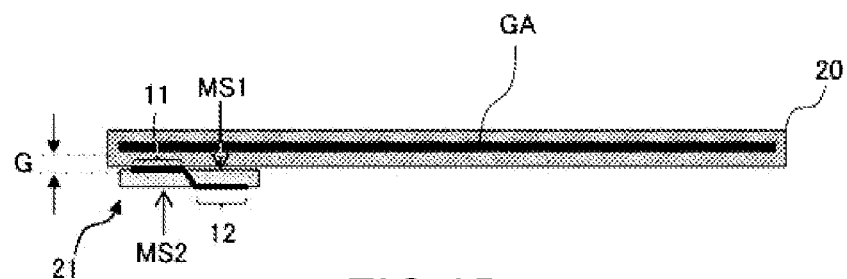
Figure 9C:
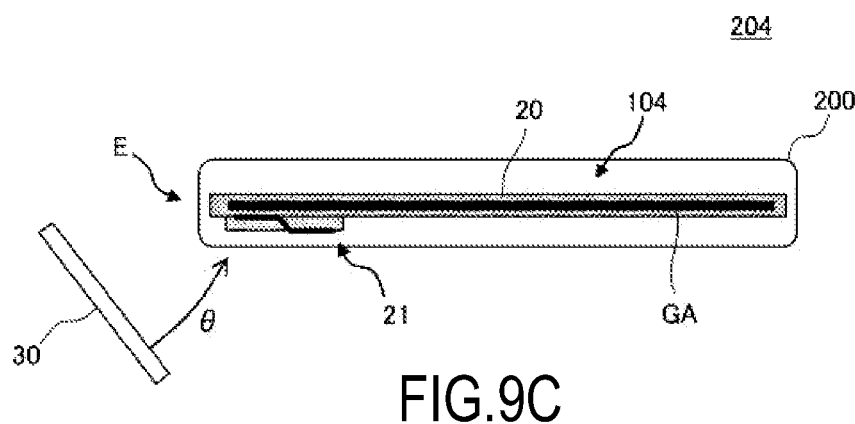

FIGS. 9A to 9C are drawings showing the configuration of a communication terminal apparatus 204 according to a fourth exemplary embodiment and that of an antenna device 104 included therein. FIG. 9A is a plan view of the antenna device 104, and FIG. 9B is a front view thereof. FIG. 9C is a schematic sectional view of the communication terminal apparatus 204.

As shown in FIG. 9A, the circuit substrate 20 uses a thermosetting resin, such as an epoxy resin, as a base material and has a ground electrode formation area GA serving as a flat conductor disposed in an inner layer thereof. Although not shown, a feeding circuit connected to the antenna coil 21 as well as various electronic components for forming the communication terminal apparatus are mounted on the front and back surfaces of the circuit substrate 20.

The antenna coil 21 is disposed so that a first conductor portion 11 is located adjacent to an end portion of a ground electrode within the ground electrode formation area GA in a plan view of the ground electrode and the antenna coil 21. The coil conductor CW and the ground electrode within the ground electrode formation area GA are disposed so that they are separated by a gap G. As seen, use of the circuit substrate 20 having the ground electrode formation area GA formed in the inner layer thereof can provide the gap G between the coil conductor CW and the ground electrode. Thus, even when the angle θ, at which the communication terminal apparatus 201 is positioned (e.g., held) over the antenna device 30 of the reader/writer, is small, the communication characteristics are improved.

The antenna coil 21 is provided such that the first conductor portion 11 of the coil conductor CW is closer to the ground electrode formation area GA than the second conductor portion 12.

The antenna coil 21 is provided such that the first conductor portion 11 of the coil conductor CW is located adjacent to an end portion E in the length direction of a case 200. The end portion in the length direction of the case 200 is a portion that becomes a top end portion when the communication terminal apparatus is held in a vertical orientation.

The communication terminal apparatus 204 has good directivity over a wide range of the angle θ shown in FIG. 9C, as described later. Thus, in wirelessly communicating with a communication partner, such as a reader/writer, while directing the end portion (the top end portion) of the length direction of the case 200 toward the communication partner, it is possible to communicate with the communication partner in a wide angle range.

Figure 10A:
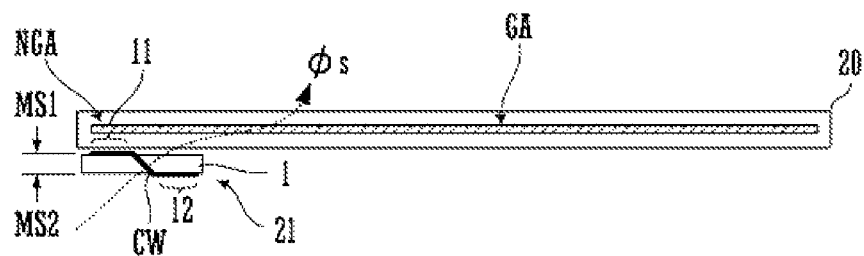
FIGS. 10A and 10B are drawings showing the aspect of a magnetic flux passing through an antenna coil of the antenna device according to the fourth exemplary embodiment.
Figure 10B:
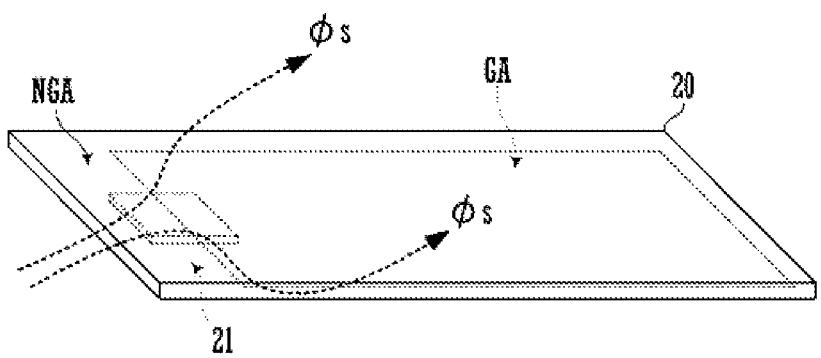

FIGS. 10A and 10B are drawings schematically showing an aspect of a magnetic flux passing through the antenna coil 21 when the angle θ shown in FIG. 9C is changed.

When θ=45°, a magnetic flux φs passes through the antenna coil 21 as shown by broken-line arrows in FIGS. 10A and 10B. Specifically, the magnetic flux φs comes into the second main surface MS2 of the magnetic core 1 and passes through the magnetic core 1 toward sides of the ground electrode formation area GA. As seen, when θ=45°, the magnetic flux passes through the central winding portion of the coil conductor.

When θ=90°, the magnetic flux comes into the outer end portion of the magnetic core 1 and passes through the magnetic core 1 toward the inner end portion thereof, as in the example shown in FIG. 4. As seen, when θ=90°, the magnetic flux again passes through the central winding portion of the coil conductor.

Figure 11:
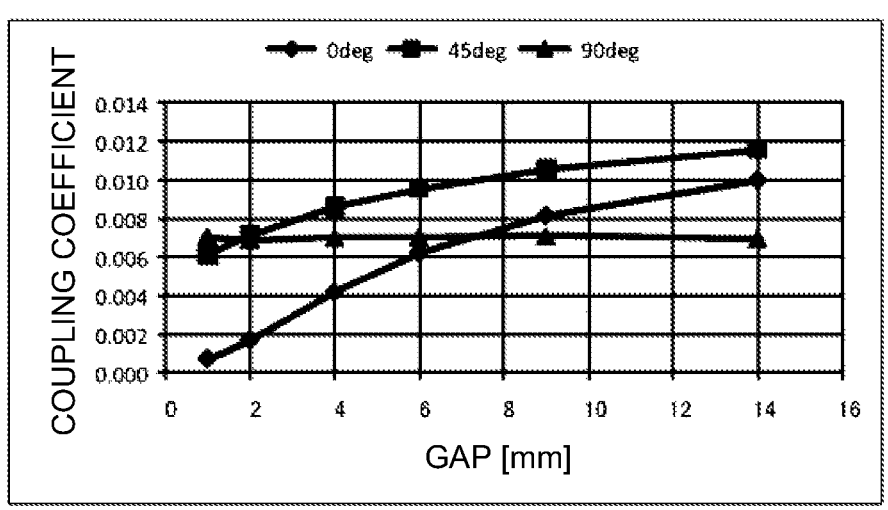
FIG. 11 is a graph showing the relationship between the gap between a ground electrode of a circuit substrate and the antenna coil and the coupling coefficient, of the antenna device according to the fourth exemplary embodiment.

FIG. 11 in a graph showing the relationship between the gap between the ground electrode of the circuit substrate and the antenna coil and the coupling coefficient. The vertical axis represents the coupling coefficient between the antenna of the reader/writer and the antenna device 104 shown in FIG. 9C. Here it is assumed that the gap between the antenna of the reader/writer and the antenna device 104 is constant, regardless of θ.

As shown in FIG. 11, when θ=90°, the coupling coefficient is not influenced by the gap between the ground electrode of the circuit substrate and the antenna coil; when θ=0° and when θ=45°, the coupling coefficient is increased as the gap between the ground electrode and the antenna coil is increased. This tendency is remarkable when θ=0°. When the gap between the ground electrode and the antenna coil is about 2 mm or more, the coupling coefficient corresponding to θ=45° reaches that corresponding to θ=90°. Thus, in using the antenna device 104 at an angle θ of 45° to 90°, it is preferred to set the gap between the ground electrode and the antenna coil to 2 mm or more. When the gap between the ground electrode and the antenna coil is about 7.5 mm or more, the coupling coefficient corresponding to θ=0° reaches that corresponding to θ=90°. Thus, in using the antenna device 104 at an angle θ of 0° to 90°, it is preferred to set the gap between the ground electrode and the antenna coil to 7.5 mm or more.

While the ground electrode within the substrate has been shown as an example of the flat conductor in the above-mentioned embodiments, an antenna device may be formed using, as the flat conductor, a shield plate disposed on the back of a liquid crystal panel, a conductive film or conductive foil formed on the inner surface of the case, or a battery pack.

Further, the flat conductor is not limited to a rectangular conductor and may have various flat shapes. Further, the flat conductor may be composed of multiple layers rather than a single layer. Further, since the flat conductor is only required to be flat in its main portion, any other portion may be a bend.

In embodiments consistent with the disclosure, when the angle which the antenna device forms with the antenna of the reader/writer is in the range of 0° to 90°, the magnetic fluxes interlinked with the coil conductor in opposite directions do not equal each other, that is, the magnetic fluxes do not cancel out each other. Thus, communications can be performed stably in the range of 0° to 90° or in a wider range.

Further, mounting the antenna coil on the ground electrode non-formation area of the circuit substrate can facilitate the formation of an antenna device.

Additionally, if the magnetic core is formed using sintered magnetic pieces, flexibility can be provided to the entire antenna coil. Thus, the magnetic core can be built in the case of a built-in destination electronic apparatus, such as a communication terminal apparatus, with a high degree of freedom.

Further, making the portion adjacent to the first conductor portion, of the magnetic core thicker than the other portions thereof reduces magnetic resistance, improving communication performance.

While exemplary embodiments have been described above, it is to be understood that variations and modifications will be apparent to those skilled in the art without departing from the scope and spirit of the disclosure.

That which is claimed is:

1. An antenna device comprising:
an antenna coil, the antenna coil comprising:
a magnetic core including a flat-plate portion having first and second flat main surfaces; and
a coil conductor wound around the magnetic core and having a shape of a spiral, the coil conductor being formed on a substrate having a through hole and surrounded by the spiral shaped conductor, the magnetic core being inserted in the through hole; and
a flat conductor adjacent to the antenna coil, wherein
a gap is provided between the antenna coil and the flat conductor,
first and second conductor portions of the coil conductor are disposed in positions that do not overlap each other in a plan view of the magnetic core when viewed in a direction perpendicular to the first flat main surface of the magnetic core, the first conductor portion being adjacent to the first flat main surface of the magnetic core, the second conductor portion being adjacent to the second flat main surface of the magnetic core,
the first flat main surface of the magnetic core faces a plane extending through a surface of the flat conductor,
the antenna coil is provided such that the first conductor portion is located adjacent to an end portion of the flat conductor in a plan view of the flat conductor and the antenna coil, and
the antenna coil substantially overlaps the flat conductor in the plan view of the flat conductor and the antenna coil except for an end portion of the antenna coil on the first conductor portion side of the antenna coil.

2. The antenna device according to claim 1, wherein
the gap is a gap through which a magnetic flux generated in the antenna coil can pass when the angle formed by a main surface of the antenna coil and a main surface of an antenna of a communication partner is 45°.

3. The antenna device according to claim 1, wherein
the flat conductor is a ground electrode formed within a circuit substrate, and
the antenna coil is provided such that the antenna coil faces the flat conductor.

4. The antenna device according to claim 2, wherein
the flat conductor is a ground electrode formed within a circuit substrate, and
the antenna coil is provided such that the antenna coil faces the flat conductor.

5. The antenna device according to claim 1, wherein
the magnetic core is a sheet-shaped mixture of a magnetic powder and a resin material or a plurality of sintered magnetic pieces.

6. The antenna device according to claim 1, wherein
one end portion of the magnetic core is thicker than the other portions thereof.

7. A communication terminal apparatus comprising:
a case; and
the antenna device according to claim 1 contained in the case.

8. A communication terminal apparatus comprising:
a case; and
the antenna device according to claim 2 contained in the case.

9. A communication terminal apparatus comprising:
a case; and
the antenna device according to claim 3 contained in the case.

10. A communication terminal apparatus comprising:
a case; and
the antenna device according to claim 4 contained in the case.

11. A communication terminal apparatus comprising:
a case; and the antenna device according to claim 5 contained in the case.

12. A communication terminal apparatus comprising:
a case; and
the antenna device according to claim 6 contained in the case.

\* \* \* \* \*